(12) United States Patent
Willis

(10) Patent No.: US 10,310,118 B2
(45) Date of Patent: Jun. 4, 2019

(54) SHEAR WAVE SOURCE FOR VSP AND SURFACE SEISMIC EXPLORATION

(71) Applicants: HALLIBURTON ENERGY SERVICES, INC., Houston, TX (US); Mark E. Willis, Katy, TX (US)

(72) Inventor: Mark E. Willis, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1117 days.

(21) Appl. No.: 14/378,310

(22) PCT Filed: Nov. 30, 2012

(86) PCT No.: PCT/US2012/067176
§ 371 (c)(1),
(2) Date: Aug. 12, 2014

(87) PCT Pub. No.: WO2013/122659
PCT Pub. Date: Aug. 22, 2013

(65) Prior Publication Data
US 2015/0012220 A1 Jan. 8, 2015

Related U.S. Application Data

(60) Provisional application No. 61/598,674, filed on Feb. 14, 2012.

(51) Int. Cl.
*G01V 1/34* (2006.01)
*G01V 1/053* (2006.01)
(Continued)

(52) U.S. Cl.
CPC .............. *G01V 1/345* (2013.01); *G01V 1/006* (2013.01); *G01V 1/053* (2013.01); *G01V 1/284* (2013.01);
(Continued)

(58) Field of Classification Search
CPC ........ G01V 1/345; G01V 1/006; G01V 1/053; G01V 1/284; G01V 1/366; G01V 1/40
(Continued)

(56) References Cited

U.S. PATENT DOCUMENTS 2,556,299 A 6/1951 Scott
2,740,489 A 4/1956 White et al.
(Continued)

FOREIGN PATENT DOCUMENTS

WO WO-2013/122659 8/2013

OTHER PUBLICATIONS

Xie, Xiao B., et al., "The Finite-Frequency Sensitivity Kernel for Migration Residual Moveout and its Applications in Migration Velocity Analysis", Geophysics, Nov.-Dec. 2008, pp. 241-249, vol. 73, No. 6.
(Continued)

*Primary Examiner* — Dzung Tran
(74) *Attorney, Agent, or Firm* — Benjamin Fite; Parker Justiss, P.C.

(57) ABSTRACT

Seismic shear-wave survey systems and methods that employ inclined borehole pairs with directional detonations. If the boreholes have substantially equal inclinations in opposite azimuthal directions, the resulting signal traces can be combined to isolate shear wave energy contributions, thereby offering potentially enhanced resolution and reduced-complexity interpretation. The boreholes may be cased to ensure repeatability for, e.g., monitoring of reservoir fracturing, treatments, and/or drainage. The directional charges may be immersed to improve coupling of seismic energy into the formation.

25 Claims, 4 Drawing Sheets

(51) Int. Cl.
*G01V 1/28* (2006.01)
*G01V 1/42* (2006.01)
*G01V 1/36* (2006.01)
*G01V 1/40* (2006.01)
*G01V 1/00* (2006.01)

(52) U.S. Cl.
CPC .............. *G01V 1/366* (2013.01); *G01V 1/40* (2013.01); *G01V 1/42* (2013.01)

(58) Field of Classification Search
USPC .................................................. 702/16, 11
See application file for complete search history.

(56) References Cited

U.S. PATENT DOCUMENTS

| | | | |
|---|---|---|---|
| 2,760,591 A | 8/1956 | White et al. | |
| 3,277,977 A | 10/1966 | Silverman | |
| 3,365,020 A | 1/1968 | Walker, Jr. | |
| 3,372,770 A | 3/1968 | Clynch | |
| 3,835,954 A | 9/1974 | Layotte | |
| 4,038,631 A * | 7/1977 | Murphy | G01V 1/053 175/1 |
| 4,050,540 A | 9/1977 | Cholet et al. | |
| 4,059,820 A | 11/1977 | Turpening | |
| 4,064,964 A | 12/1977 | Norden | |
| 4,284,006 A | 8/1981 | Davis | |
| 4,660,674 A | 4/1987 | Airhart | |
| 4,712,641 A | 12/1987 | Chelminski | |
| 4,793,435 A | 12/1988 | Smith et al. | |
| 4,867,266 A | 9/1989 | Martin | |
| 5,483,026 A | 1/1996 | Hasbrouck et al. | |
| 6,419,044 B1 | 7/2002 | Tite et al. | |
| 6,490,529 B1 | 12/2002 | Norris et al. | |
| 6,648,097 B2 | 11/2003 | Tite et al. | |
| 7,395,897 B2 | 7/2008 | Gilmer et al. | |
| 7,650,962 B2 | 1/2010 | Quinn et al. | |
| 7,916,578 B2 | 3/2011 | Minto et al. | |
| 8,040,754 B1 * | 10/2011 | Hardage | G01V 1/284 367/37 |
| 2004/0035582 A1 * | 2/2004 | Zupanick | E21B 43/006 166/313 |
| 2004/0117120 A1 * | 6/2004 | Frenkel | G01V 11/00 702/7 |
| 2006/0081414 A1 * | 4/2006 | Matherne | G01V 1/143 181/121 |
| 2007/0210799 A1 * | 9/2007 | Tabarovsky | G01V 3/28 324/338 |
| 2008/0316860 A1 * | 12/2008 | Muyzert | G01V 1/42 367/25 |
| 2011/0255370 A1 * | 10/2011 | Hirabayashi | G01V 1/42 367/31 |
| 2012/0163121 A1 * | 6/2012 | Hardage | G01V 1/286 367/21 |

OTHER PUBLICATIONS

Byerley, Grant et al., "4D Seismic Monitoring Applied to SAGD Operations at Surmont, Alberta, Canada", International Exposition and Annual Meeting, SEG, Houston 2009, pp. 3959-3963.

Martner, S.T. et al., "Broomstick Distributed Charge", Geophysics, Dec. 1962, p. 1007-1015, vol. XXVII, No. 6, Part 11.

White, J.E. et al., "Shear Waves from Explosive Sources", Geophysics, Dec. 1963, p. 1001-1019, vol. XXVIII, No. 6.

Bois, P. et al., "Well-to-Well Seismic Measurements", Geophysics, Jun. 1972, p. 471-480, vol. 37, No. 3 (Jun. 1972).

Hardee, H.C. et al., "Downhole Seismic Source", Geophysics, Jun. 1987, p. 729-739, vol. 52, No. 6.

Kim, Christopher D., et al., "Use of an Impulsive Shear Wave Source in a Limestone-Covered Area on the Eastern Shelf in Central Texas", Bolt Technology Corporation, S 11.5, http://segdl.ord, 3 pgs.

Meadows, Mark A., et al., "Seismic Detection of a Hydraulic Fracture from Shear-Wave VSP Data at Lost Hills Field, California", Geophysics, vol. 59, No. 1 (Jan. 1994), pp. 11-26.

PCT International Search Report and Written Opinion, dated Feb. 5, 2013, Appl No. PCT/US2012/067176, "Shear Wave Source for VSP and Surface Seismic Exploration", filed Nov. 30, 2012, 13 pgs.

Claerbout, Jon F., "Chapter 1: Introduction to Imaging", Imaging the Earth's Interior, 1985, p. 1-80, Blackwell Scientific Publications, Palo Alto, California, USA.

* cited by examiner

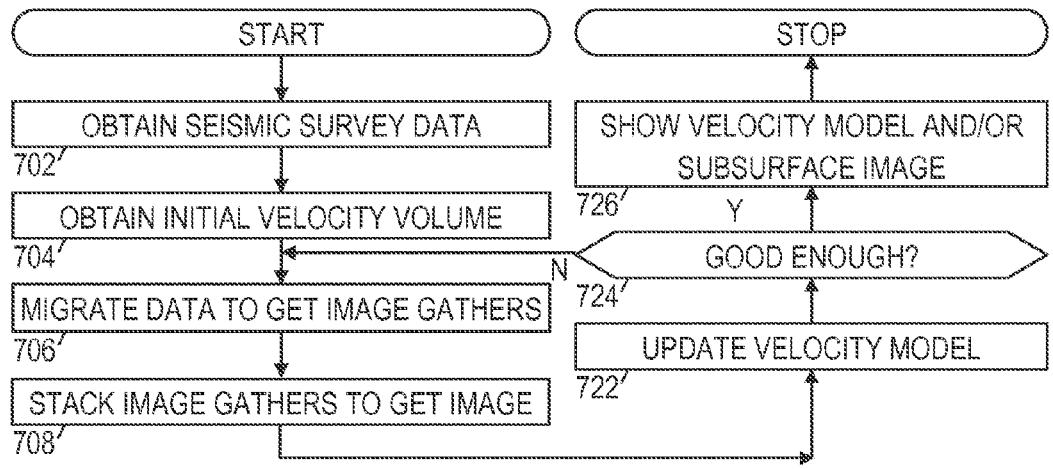
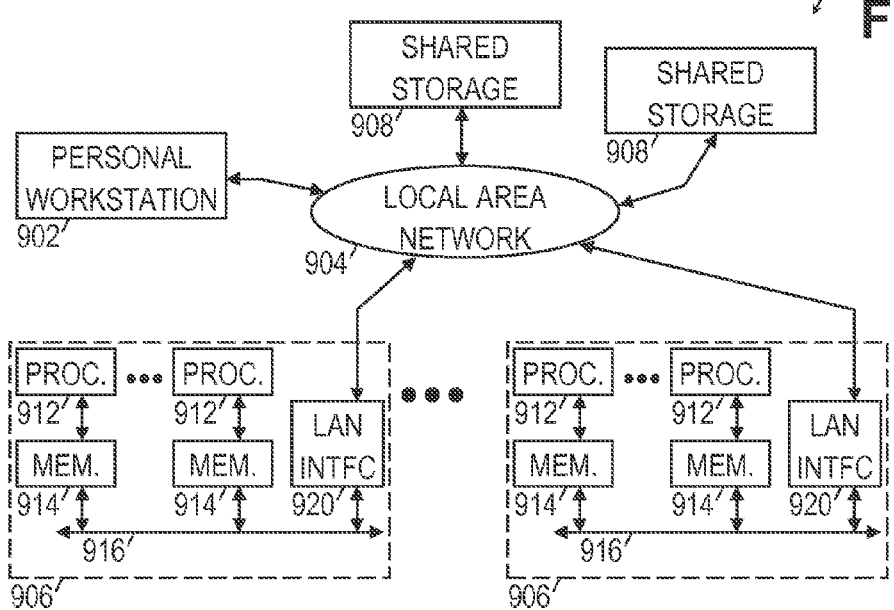

SHEAR WAVE SOURCE FOR VSP AND SURFACE SEISMIC EXPLORATION

RELATED APPLICATIONS

This application claims priority to Provisional U.S. Application Ser. No. 61/598,674, titled "Shear Wave Source for VSP and Surface Seismic Exploration" and filed Feb. 14, 2012 by M. E. Willis, which is hereby incorporated herein by reference.

BACKGROUND

Seismology is used for exploration, archaeological studies, and engineering projects that require geological information. Exploration seismology provides data that, when used in conjunction with other available geophysical, borehole, and geological data, provides information about the structure and distribution of rock types and their contents. Such information greatly aids searches for water, geothermal reservoirs, and mineral deposits such as hydrocarbons and ores. Most oil companies rely on exploration seismology to select sites in which to drill exploratory oil wells.

Traditional seismology employs artificially-generated seismic waves to map subsurface structures. The seismic waves propagate from a seismic energy source down into the earth and reflect from boundaries between subsurface structures. Surface receivers detect and record reflected seismic waves for later analysis.

The seismic waves are usually generated by energizing the earth with a suitable source of seismic wave energy. Most commonly, the seismic energy sources create elastic waves involving earth particle movement in the direction of wave propagation. These waves, referred to as compressional or longitudinal waves, are readily generated by delivering a vertical impact against the earth's surface with an explosion or a mechanical transducer. The technical literature has expressed the utility for seismic prospecting employing a second form of wave, termed shear waves, wherein the earth particle motion is orthogonal to the direction of wave propagation. Shear waves have slower rates of propagation through the earth than do longitudinal waves so they can produce a higher degree of resolution at a given frequency. This may enable the detection of subterranean anomalies that might otherwise be undetectable and the mapping of larger bodies with a higher degree of precision. Horizontally polarized shear waves are also less likely to be converted into different wave types upon interacting with horizontal interfaces as is the case with compression waves and accordingly seismograms made from such waves may be simpler to interpret.

Despite these recognized advantages, the use of shear waves in seismic prospecting has been greatly limited because of the unavailability of suitable shear wave energy sources. The difficulty encountered in designing such energy sources involves the manner of coupling an impact to the earth so that it will impart the desired shear motion to the earth's surface. Thus far, shear wave energy sources have proven to be infeasible or lacking in sufficient reproducibility, frequency band width, and power for repeated high resolution surveys for, e.g., reservoir monitoring.

BRIEF DESCRIPTION OF THE DRAWINGS

Accordingly, there are disclosed in the drawings and the following description specific embodiments of a shear wave source having improved feasibility and repeatability. In the drawings:

FIG. 6 shows a flowchart of an illustrative seismic imaging method; and

FIG. 7 shows an illustrative imaging system.

Figure 1:
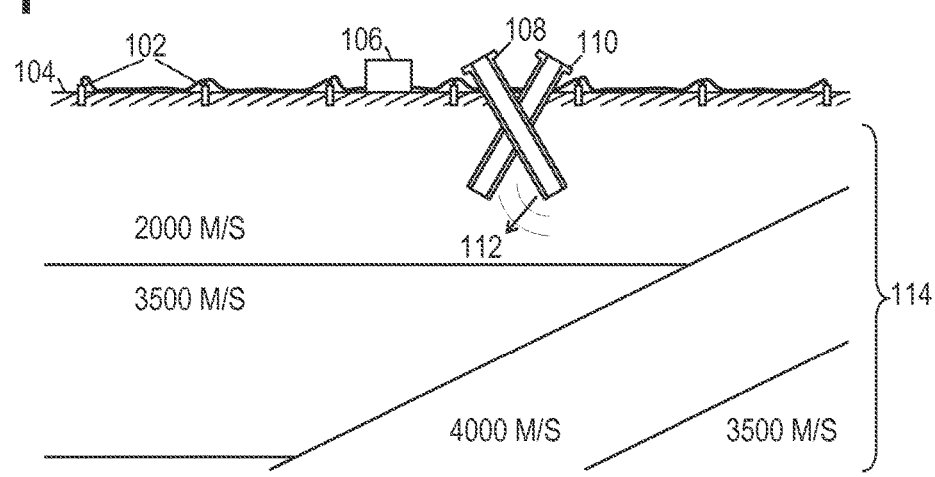
FIG. 1 shows an illustrative seismic survey environment.

It should be understood, however, that the specific embodiments given in the drawings and detailed description thereto do not limit the disclosure, but on the contrary, they provide the foundation for one of ordinary skill to discern the alternative forms, equivalents, and modifications that are encompassed by the scope of the appended claims

DETAILED DESCRIPTION

The disclosed systems and methods are best understood when described in an illustrative usage context. Accordingly, FIG. 1 shows an illustrative seismic survey environment in which surveyors position an array of seismic receivers 102 in a spaced-apart arrangement on the earth's surface 104 to detect seismic waves. The array typically extends for a couple of kilometers in each direction, and may be moved after each series of shots until the whole survey region has been covered. As used herein, the term "shot" refers to a pulse of seismic wave energy generated by a seismic energy source at a given time and location. When the seismic energy source employs explosive charges, each shot may be the result of a single detonation or the result of a timed sequence of multiple detonations designed to create a shaped wave field.

The receivers 102 communicate wirelessly or via cable to a data acquisition unit 106 that receives, processes, and stores the seismic signal data collected by the receivers. The surveyors trigger seismic energy sources 108, 110 at multiple orientations and optionally at multiple positions ("shot locations") to generate compressional and shear waves 112 that propagate through the earth 114. Such waves reflect from acoustic impedance discontinuities to reach the receivers 102. Illustrative discontinuities include faults, boundaries between formation beds, and boundaries between formation fluids. (FIG. 1 shows three relatively flat formation layers and two dipping formation layers of varying composition and hence varying speeds of sound, causing acoustic impedance changes at the boundaries.) The discontinuities appear as bright spots in the subsurface structure representation that is derived from the seismic signal data.

The seismic energy sources 108, 110 shown in FIG. 1 are unique in that they are positioned within angled, cased boreholes. The boreholes for the sources may be of any depth, but it is contemplated that they would not usually exceed 100 feet in depth. Though the boreholes are shown as being straight, they may be curved, e.g., being vertical at the surface and being at the desired inclination angle at depth. As any shear waves that are generated are not expected to propagate significantly along the borehole axis, the well is sloped to promote propagation of the shear waves downward into the earth. An explosive charge operating as the seismic energy source may be detonated near the bottom of the borehole to generate compressional and shear waves. To enhance the generation of shear waves, the explosive charge may be configured to generate a progressive or staged detonation along the borehole axis. One configuration for providing such a detonation is shown in FIG. 2c.

Figure 2A:
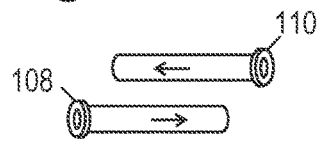
FIGS. 2a-2b show illustrative seismic source geometries.
Figure 2B:
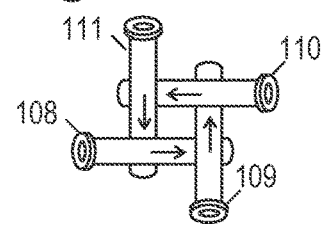
Figure 2C:
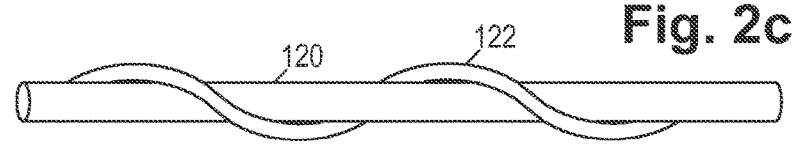
FIG. 2c shows an illustrative broomstick charge configuration.

FIG. 2c shows a "broomstick distributed charge" seismic energy source created by wrapping primacord (or HMX) 122 around a wooden rod 120. Since primacord detonates at specific velocity, wrapping the primacord helically around a notched rod will control the speed at which the detonation progresses along the borehole axis, thereby imparting the desired directional aspect to the detonation. The velocity of the detonation will be controlled by the "pitch" of the windings of the primacord around the rod. A slower detonation velocity will likely impart more directly induced shear wave energy. But in any case, due to the tilted inclination of the seismic energy source in the borehole, and the physical length of the rod coupled with its slow velocity of detonation, this source will create an inclined force which will have increased shear wave energy radiating downward from it with a specific polarized particle motion.

Other directional sources are known and can also be employed. One alternative configuration employs a series of small explosive charges detonated by a timing device or other mechanism such that the explosive charge at one end of the source fires first, followed by a series of small delays before the firing of each successive explosive charge.

To improve coupling of the explosive energy from the borehole into the formation, the borehole may be filled with a fluid, e.g., water.

Because the borehole is cased, it is expected that it will be re-usable. When the survey is repeated, a similar charge is placed at the same location in the boreholes and detonated. The presence of the casing protects the surrounding formation from damage and/or borehole collapse, which could result if the borehole were exposed directly to the explosions. Because the borehole wall remains relatively undamaged and thus unchanged between shots, the propagation of the seismic energy through the near-borehole formation for each shot should remain relatively uniform, enabling later surveys to be compared with earlier surveys.

It is noted that two inclined boreholes are shown in FIG. 1. To enable separation of the shear wave information from the compressional wave information, two boreholes are provided at similar inclination angles, but 180° apart from each other as indicated in FIG. 2a. If the borehole bottoms are near enough, the signals acquired in response to each firing can be combined (e.g., subtracted) to cancel the (non-directional) compressional wave information and reinforce the (directional) shear wave information. Conversely, the signals can be combined (e.g., added) to remove the shear wave information and reinforce the compressional wave information. Though FIG. 1 shows a survey with a surface array, one or more receiver arrays can be deployed in nearby boreholes (not shown) to perform Vertical Seismic Profiling surveys.

To locate the borehole bottoms in close proximity, the well heads may be located at some distance from each other. The actual locations may involve some tradeoffs with respect to source proximity and restrictions on surface drilling locations.

FIG. 2b shows boreholes 108 and 110 interspersed with a second pair of boreholes 109, 111. As the second pair of boreholes is oriented orthogonal to the first pair, it offers a shear wave polarization orthogonal to that of the first pair. As before, the borehole bottoms are preferably located in fairly close proximity.

The disclosed shear wave source configurations enable the generation of repeatable, broad bandwidth shear waves so that surveyors can, for example, perform 9 component VSP surveys, as well as specifically monitor hydraulic fracture operations. Shear waves are sensitive to fluid and gas in the fractures. Published studies by Chevron in 1992 and 1994 specifically show that shear waves are diffracted or reflected off of the induced hydraulic fractures for a short time period after the hydraulic fracturing pumps are shut off. More specifically, the studies showed that these shear waves disappear within about 2 hours after the pumps are shut off. So with these boreholes in place and the sources ready to go, the engineers can actually monitor the fluid filled fracture while it is open and characterize the success of the fracture treatment in a fashion that is complementary to microseismic monitoring. See, e.g., Meadows and Winterstein, *Seismic detection of a hydraulic fracture from shear-wave VSP data at Lost Hills Fields, California*, Geophysics, Vol. 59, No. 1, January 1994 at 11-26.

To summarize, two or four shallow boreholes can be drilled very closely together at inclined directions, preferably about 45 degrees from the vertical. (Angles as small as 15 degrees may suffice.) Each pair of wells is drilled 180 degrees from each other in map view. For example one is drilled in the East direction at 45 degrees inclination from the vertical, while the other one is drilled in the West direction at 45 degrees from vertical. Each of the shallow boreholes is optionally lined with PVC or metal casing. (This may not be necessary in hard-rock country.) A directional explosive source (e.g., the broomstick charge of FIG. 2c) is placed in each borehole, and each is detonated separately, with the response of the receiver array to each detonation being acquired and recorded. Combining the recordings of array response signals for sources directionally detonated at orientations 180 degrees from each other in map view by summing the signals will enhance the (compressional) P-wave energy and reduce the shear wave energy. Combining the acquired array response signal recordings made from these same directional detonations by differencing them will enhance the shear wave energy and reduce the P-wave energy. The shear wave source is optionally detonated again later in the same cased holes to enable a time lapse recording of changes in the subsurface. The results of the above-described combinations and time lapse recordings may be displayed as a three-dimensional image, as described below.

Applications include monitoring the effects of hydraulic fracturing on the properties of the reservoir, monitoring the effects of thermal heating in the reservoir, monitoring fluid drainage in the reservoir, and monitoring secondary recovery efforts by fluid and gas injection.

While it should be possible to reload and trigger each borehole fairly quickly and efficiently (e.g., within 15 minutes), some applications may have speed as a critical factor. For such applications, a series of inclined boreholes may be drilled in close proximity to enable repeated firings without the waiting time for reloads. Where such speed requirements do not exist, the opportunity for repeatable shots with a single pair of boreholes is expected to be quite valuable as high-quality time lapse data can be captured very efficiently.

Figure 2D:
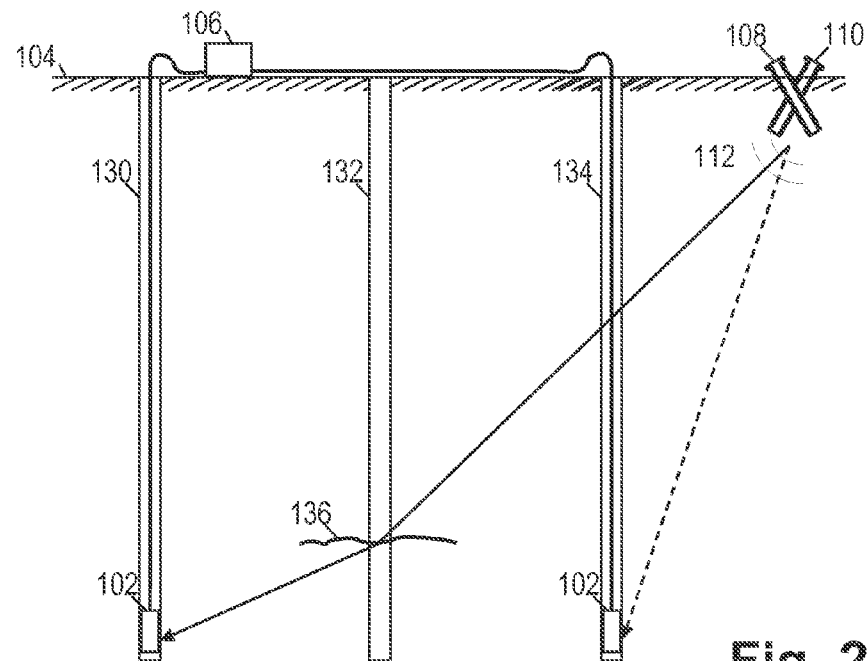
FIG. 2d shows an illustrative seismic survey environment used during hydraulic fracturing operations.

FIG. 2d shows an illustrative seismic survey recording system used to provide time-lapse monitoring of hydraulic fracturing operations of a well 132. Pairs of detonations are repeatedly triggered within boreholes 108 and 110 at 15 minute intervals, and the shear-waves produced by each pair of detonations is detected by receivers 102 within reference well 134 and measurement well 130. The solid arrow shows the shear-wave path from the source and through the fracture zone 136 of well 132 to measurement well 130. The dashed arrow shows the shear-wave path from the source to reference well 134. As already noted, seismic waves generated by a shear-wave source are diffracted and/or scattered when passing through a fluid-filled fracture, an effect that is particularly noticeable during the first 1-2 hours after the hydraulic fracturing pumps have been shut off or shutdown. Because this diffraction and/or scattering primarily affects the slow shear-waves, the shear-wave information acquired by data acquisition unit 106 is further processed to extract the slow shear-wave information (e.g., using an Alford rotation to separate fast and slow shear-wave information).

Figure 2E:
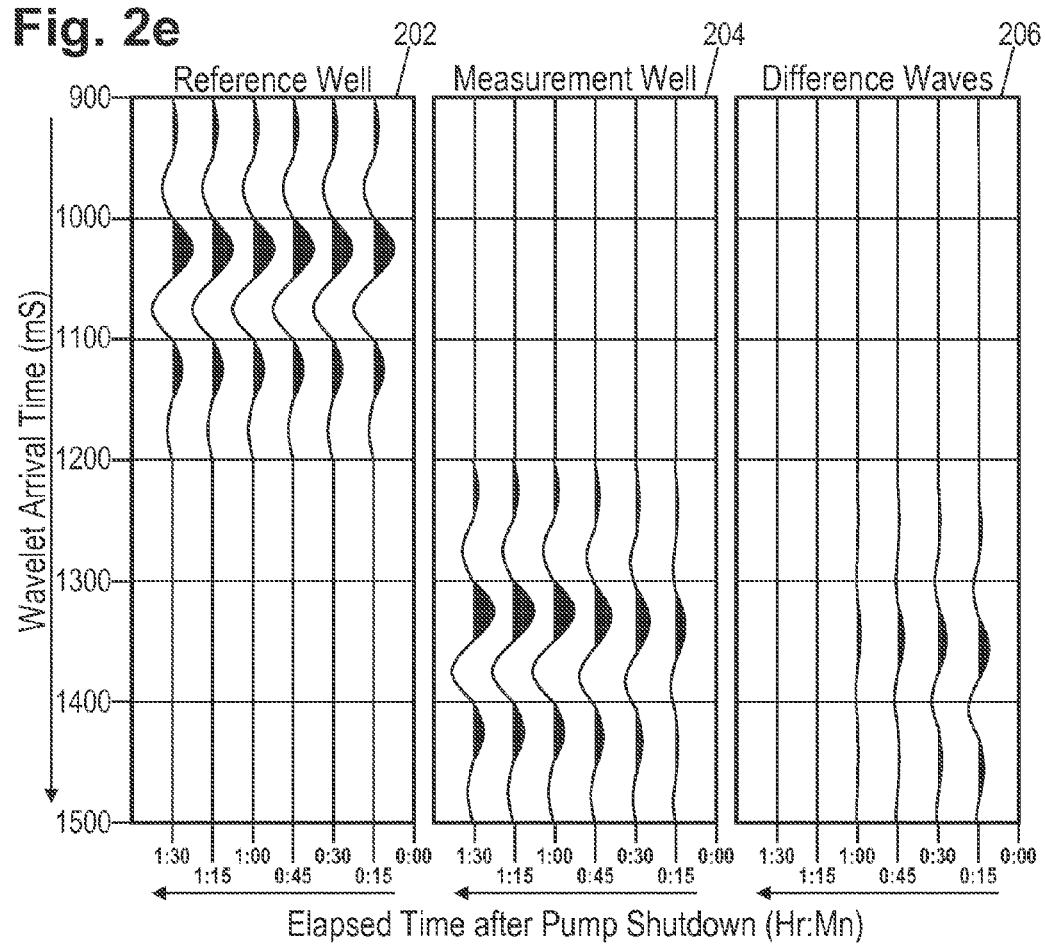
FIG. 2e shows signal graphs of seismic data acquired and processed by an illustrative seismic survey recording system during hydraulic fracturing operations.

FIG. 2e shows illustrative examples of seismic information acquired by receiver 102 within reference well 134 of FIG. 2d (graph 202) and by receiver 102 within measurement well 130 (graph 204). The slow shear-wave information shown is acquired for each pair of detonations triggered and sampled at 15 minutes intervals over a 2 hour period after the hydraulic fracturing pumps are shut off. The illustrative behavior shown is applicable to a single stage fracturing, as well as to one or more stages of a multi-stage fracturing. The graphs isolate wavelet arrival times relative to the detonation times between 900 and 1500 milliseconds, though these times are presented as examples for explanation purposes only. The slow shear-wave wavelets of reference well graph 202 display no noticeable variation between detonations for the time interval shown after the hydraulic fracturing pumps have been shut off. By contrast, measurement well graph 204 shows a significant variation in the amplitude, wave velocity and wave shape of the wavelets received within the first hour, as compared to later received wavelets. In at least some illustrative embodiments, these variations are further isolated and displayed by subtracting the slow shear-wave information corresponding to the last detonation from slow shear-wave information corresponding to each of the previous detonations. The results of this operation are shown in graph 206 of FIG. 2e. In other illustrative embodiments, the difference results may be shown as a single wavelet graph that is presented as an animated time-lapse sequence. It should be noted that although the above-described embodiments focus on the period immediately after the hydraulic fracturing pumps are shut off, in other illustrative embodiments the shear-wave information may be generated, received and processed as described while the pumps are still running, thus tracking any and all parts of the fracturing process both before and/or after the pumps are shut off.

It should be noted that although the above-described examples show three wells and a single receiver in each of the reference and measurement wells, other numbers of wells (fewer or greater) and additional receivers in each well may also be used with the disclosed systems and methods. Also, although processing of slow shear waves generated by the disclosed systems and methods is described, additional or alternative processing of the fast shear waves produced by the disclosed systems and methods is also contemplated.

Figure 3:
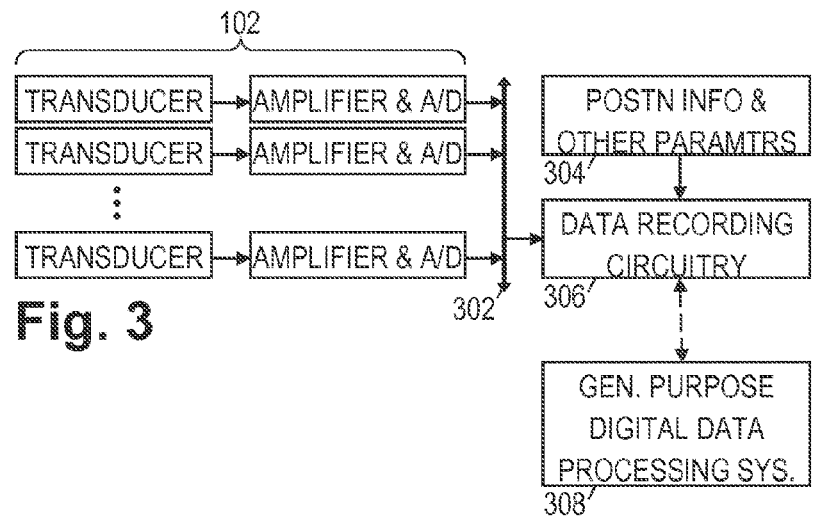
FIG. 3 shows an illustrative seismic survey recording system.

FIG. 3 shows an illustrative seismic survey recording system having the receivers 102 coupled to a bus 302 to communicate digital signals to data recording circuitry 306. Position information sensors 304 (and optionally sensors for other parameters) are also coupled to the data recording circuitry 306 to enable the data recording circuitry to store additional information useful for interpreting the recorded data. Illustratively, such additional information can include the precise locations of the receivers and source firings, source waveform characteristics, digitization settings, detected faults in the system, etc.

Figure 4:
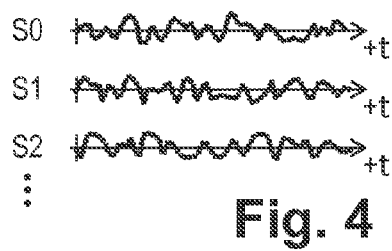
FIG. 4 shows illustrative seismic traces.

Seismic sensors within receivers 102 may each include multi-axis accelerometers and/or geophones and, in some environments, hydrophones, each of which may take high-resolution samples (e.g., 16 to 32 bits) at a programmable sampling rate (e.g., 400 Hz to 1 kHz). Recording circuitry 306 acquires the data streams provided by receivers 102 onto a nonvolatile storage medium such as a storage array of optical or magnetic disks. The provided data is stored in the form of (possibly compressed) sets of seismic traces, each trace being the signal detected and sampled by a given receiver in response to a given shot. (The associated shot and receiver positions are also stored.) Illustrative seismic signals are shown in FIG. 4. The signals indicate some measure of seismic wave energy as a function of time (e.g., displacement, velocity, acceleration, pressure).

The signal data can be partitioned in different ways to make processing and analysis more feasible. When partitioned based on a given parameter, each data partition is called a "gather". For example, a "shot gather" is the group of traces recorded for a single firing of the seismic source. A "common midpoint gather" is the group of traces that have a midpoint within a defined region. "Image gathers" are partitions of the migrated ("image") data based on the given parameter. Thus "common offset image gathers" constitute partitions of the image data according to the distance between source and receiver, while "common angle image gathers" are partitioned according to the incidence (or reflection) angle of seismic energy at the image point. At one or more points in the image formation process, the gathers may be added together ("stacked") to obtain a combined data set, e.g., a final image of the subsurface structure.

A general purpose data processing system 308 receives the acquired seismic survey data from the data recording circuitry 306. In some cases the general purpose data processing system 308 is physically coupled to the data recording circuitry and provides a way to configure the recording circuitry and perform preliminary processing in the field. More typically, however, the general purpose data processing system is located at a central computing facility with adequate computing resources for intensive processing. The survey data can be transported to the central facility on physical media or communicated via a computer network. Processing system 308 includes a user interface having a graphical display and a keyboard or other method of accepting user input, enabling users to view and analyze the subsurface structure images derived from the seismic survey data.

Figure 5:
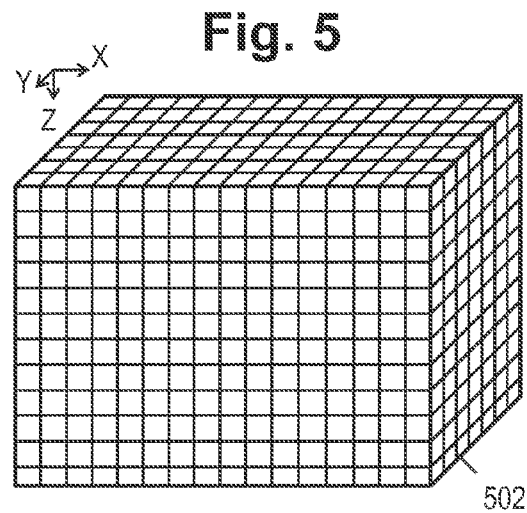
FIG. 5 shows an illustrative data volume in three dimensions.

The recorded seismic survey data is processed/combined to create a data volume, i.e., a three dimensional array of data values such as that shown in FIG. 5. The data volume represents some seismic attribute throughout the survey region. The three-dimensional array comprises uniformly-sized cells, each cell having a data value representing the seismic attribute for that cell. Various seismic attributes may be represented, and in some embodiments, each cell has multiple data values to represent multiple seismic attributes. Examples of suitable seismic attributes include reflectivity, acoustic impedance, acoustic velocity, and density. The volumetric data format readily lends itself to computational analysis and visual rendering, and for this reason, the data volume may be termed a "three-dimensional subsurface image" or "three-dimensional subsurface log" of the survey region. Such an image or log allows finer structures to be presented to the user with less distortion than, for example, a side-by-side plot of the recorded waveforms.

An illustrative seismic data processing method is shown in FIG. 6. It begins in block 702 with the obtaining of seismic survey data. The survey data is typically in a trace format, e.g., wave field data as a function of shot location, receiver location, and time, $P(r_s,r_R,t)$, derived from combining the array response signals from the directional detonations. Traditionally a change of variable is performed to place this data in the midpoint-offset-time domain, i.e., $P(m,h,t)$, where midpoint $m=(r_s+r_R)/2$ and offset $h=|r_s-r_R|/2$. Observing that this data represents the wave field observed at the surface (z=0), the wavefield equation is employed to extrapolate the subsurface wavefield, a process known as migrating the data. The fundamentals for this process are described in Chapter 1 of Jon F. Claerbout, *Imaging the Earth's Interior*, Blackwell Scientific Publications, Oxford, 1985.

Among other things, migration requires a velocity model $v(r)$, which specifies a wave propagation speed for every point r in the subsurface volume V. Accordingly, an initial velocity model is postulated in block 704. An initial velocity model can be postulated based on any one of a number of approaches including: a constant velocity, a velocity that increases linearly with depth, a velocity derived from theoretical models of rock compaction, and measured values from sonic logs of an exploratory borehole.

In block 706, the velocity model is used to migrate the survey data. Any one of the existing wave-equation based migration techniques can be employed to obtain the subsurface data volume. Various migration techniques can be employed. Such alternative techniques may result in different image gathers, e.g., shot index gathers as described in Xie, X., and H. Yang, 2008, The finite-frequency sensitivity kernel for migration residual moveout: Geophysics, 73, S241-249.

In block 708, the gathers are stacked to obtain a combined image of the structure in the subsurface volume. Even though the velocity model may be in error, one can usually perceive significant structure in the stacked image data. The individual gathers and stacked image data can be processed to derive depth residuals or other measures of the velocity model error. Based on such errors, the velocity model is updated in block 722. In block 724, the system determines whether the velocity model is satisfactory. One possible test is whether convergence has been achieved, i.e., whether the velocity updates are below some predetermined threshold. Another possible test is whether the residual moveout has been largely eliminated from the image gathers or whether the stacked image data appears reasonably clear and free of ghosting or smearing. If the velocity model is not satisfactory, the blocks 706-724 are repeated until the velocity model is deemed satisfactory. The system displays the final subsurface log or image to a user in block 726.

It is contemplated that the operations shown in FIG. 6 may be implemented in the form of software, which can be stored in computer memory, in long-term storage media, and in portable information storage media. It should be noted that illustrative method of FIG. 6 is provided as an explanatory aid. In practice, the various operations shown in FIG. 6 may be performed in different orders and need not even be sequential. Seismic data processing can benefit substantially from parallelism. In some processing method embodiments, data from different survey regions may be processed independently. In other embodiments, the operations may be "pipelined" or otherwise performed concurrently. Additional operations may be added to the illustrative method and/or several of the operations shown may be omitted.

FIG. 7 shows an illustrative computer system 900 for performing seismic data processing including seismic imaging using shear wave survey information. A personal workstation 902 is coupled via a local area network (LAN) 904 to one or more multi-processor computers 906, which are in turn coupled via the LAN to one or more shared storage units 908. LAN 904 provides high-speed communication between multi-processor computers 906 and with personal workstation 902. The LAN 904 may take the form of an Ethernet network.

Personal workstation 902 serves as a user interface to the processing system, enabling a user to load survey data into the system, to retrieve and view image data from the system, and to configure and monitor the operation of the processing system. Personal workstation 902 may take the form of a desktop computer with a graphical display that graphically shows survey data and 3D images of the survey region, and with a keyboard that enables the user to move files and execute processing software.

Multi-processor computer(s) 906 provide parallel processing capability to enable suitably prompt conversion of seismic trace signals into a survey region image. Each computer 906 includes multiple processors 912, distributed memory 914, an internal bus 916, and a LAN interface 920. Each processor 912 operates on an allocated portion of the input data to produce a partial image of the seismic survey region. Associated with each processor 912 is a distributed memory module 914 that stores conversion software and a working data set for the processor's use. Internal bus 916 provides inter-processor communication and communication to the LAN networks via interface 920. Communication between processors in different computers 906 can be provided by LAN 904.

Shared storage units 908 may be large, stand-alone information storage units that employ magnetic disk media for nonvolatile data storage. To improve data access speed and reliability, the shared storage units 908 may be configured as a redundant disk array. Shared storage units 908 initially store an initial velocity data volume and shot gathers from a seismic survey. The (iteratively-updated) common angle image gathers can be temporarily stored on shared storage units 908 for later processing. In response to a request from the workstation 902, the image volume data can be retrieved by computers 906 and supplied to workstation for conversion to a graphical image to be displayed to a user.

Numerous variations and modifications will become apparent to those skilled in the art once the above disclosure is fully appreciated. For example, the inclined boreholes may be drilled as oppositely-directed laterals from a common vertical shaft. Also, although the time lapse sequence of the example presented was produced from shear wave information acquired from shots triggered and sampled at 15 minute intervals over a period of 2 hours after pump shutdown, embodiments that use different intervals and periods are within the scope of the present disclosure. In many cases, three-dimensional image logs may be replaced by two-dimensional image logs. It is intended that the following claims be interpreted to embrace all such variations and modifications.

What is claimed is:

1. A method of surveying with seismic shear waves, the method comprising:
    generating the seismic shear waves with directional detonations detonated separately but at approximately a same time, the directional detonations in a pair of inclined boreholes that cross from a side profile but do not intersect and have similar inclination angles of approximately 45° from vertical in opposite azimuthal directions;

acquiring signals representative of a receiver array's response to each of the pair of directional detonations;

subtracting the response signals to suppress compressional wave information and enhance shear wave information; and displaying a subsurface log or image derived from the subtracted responses, wherein the acquired signals reflect a diffraction or scattering of the generated seismic shear waves as they pass through a fluid-filled fracture in a formation being surveyed.

2. The method of claim 1, further comprising:
obtaining a second pair of inclined boreholes at azimuths orthogonal to the first pair;
providing in each of the second pair of inclined boreholes one of a second pair of directional detonations;
acquiring additional signals representative of the receiver array's responses to each of the second pair of directional detonations; and
combining the additional response signals to suppress additional compressional wave information and enhance additional shear wave information.

3. The method of claim 1, wherein the receiver array is a surface array.

4. The method of claim 1, wherein the receiver array is deployed in an additional borehole.

5. The method of claim 1, wherein the inclined boreholes are cased.

6. The method of claim 1, wherein said providing a directional detonation includes immersing a broomstick charge in liquid at the bottom of at least one of the boreholes.

7. The method of claim 1, wherein the bottoms of the boreholes in each pair are within 10 meters of each other.

8. The method of claim 1, further comprising:
processing the responses further to obtain compressional wave information with shear wave information suppressed; and
displaying a subsurface image derived from the compressional wave information.

9. The method of claim 1, further comprising:
repeating directional detonations in each inclined borehole;
acquiring the receiver array's responses to the repeated directional detonations;
separating the shear wave information into slow and fast shear wave components; and
displaying the slow shear wave information as at least part of the derived subsurface log or image.

10. The method of claim 9, wherein the directional detonations in each inclined borehole are repeated at a given time interval.

11. The method of claim 1, further comprising:
repeating the providing of the directional detonations and the acquiring of the responses before or after a pump used to hydraulically fracture a formation being surveyed is shut off;
separating the shear wave information into slow and fast shear wave components; and
displaying the slow shear wave information as at least part of the derived subsurface log or image.

12. The method of claim 11, further comprising displaying the slow shear wave information as a time-lapse sequence.

13. The method of claim 11, further comprising:
subtracting the slow shear wave information acquired during a final repetition at the end of the time period from the slow shear wave information acquired during each prior repetition; and
displaying each subtracting result as at least part of the displaying of the slow shear wave information.

14. A shear wave surveying system that comprises:
a pair of inclined boreholes that cross from a side profile but do not intersect and have similar inclination angles of approximately 45° from vertical in opposite azimuthal directions;
a receiver array that provides data in the form of one or more sets of seismic traces in response to shear waves generated by directional detonations detonated separately but at approximately a same time in each of said boreholes;
a recording system that records each set of seismic traces; and
a processing system that subtracts the sets to extract enhanced shear-wave information and provide a subsurface log or image of subsurface formation structures, wherein the enhanced shear-wave information reflects a diffraction or scattering of the generated shear waves as they pass through a fluid-filled fracture in a formation being surveyed.

15. The system of claim 14, further comprising:
a second pair of inclined boreholes at azimuths orthogonal to the first pair.

16. The system of claim 14, wherein the receiver array is a surface array.

17. The system of claim 14, wherein the receiver array is a vertical seismic profiling array.

18. The system of claim 14, wherein said boreholes are cased.

19. The system of claim 14, wherein said boreholes are water-filled.

20. The system of claim 14, wherein said directional detonations result from broomstick charges.

21. The system of claim 14, wherein said directional detonations result from a time-sequenced series of charges.

22. The system of claim 14, wherein the bottoms of the borehole are within 10 meters of each other.

23. The system of claim 14, wherein the processing system provides time-lapse log or image comparisons derived from repeated detonations in the inclined boreholes.

24. The system of claim 14, wherein the processing system calculates a difference between slow shear-wave information associated with a final detonation of a plurality of detonations triggered during a given time period and slow shear-wave information associated with each prior detonation of the plurality of detonations, and wherein at least part of the log or images provided is representative of the calculated differences.

25. The system of claim 14, wherein at least some of the extracted shear-wave information is associated with a plurality of repeated detonations triggered during a given time period before or after a pump used to hydraulically fracture a borehole being surveyed is shut off.

* * * * *